(12) United States Patent
Huffman et al.

(10) Patent No.: US 8,101,149 B1
(45) Date of Patent: *Jan. 24, 2012

(54) FORM OF CARBON

(75) Inventors: Donald R. Huffman, Tucson, AZ (US); Wolfgang Krätschmer, Gaiberg (DE)

(73) Assignee: Mitsubishi Corporation (JP)

(*) Notice: Subject to any disclaimer, the term of this patent is extended or adjusted under 35 U.S.C. 154(b) by 0 days.

This patent is subject to a terminal disclaimer.

(21) Appl. No.: 08/471,890

(22) Filed: Jun. 7, 1995

Related U.S. Application Data

(63) Continuation of application No. 07/580,246, filed on Sep. 10, 1990, now Pat. No. 7,494,638, which is a continuation-in-part of application No. 07/575,254, filed on Aug. 30, 1990, now abandoned.

(51) Int. Cl.
C01B 31/02 (2006.01)
C01B 31/00 (2006.01)

(52) U.S. Cl. ............ 423/445 B; 977/735; 977/844; 977/845

(58) Field of Classification Search ............ 423/445 B, 423/460, 449.1, 448, 445 R; 204/157.47
See application file for complete search history.

(56) References Cited

U.S. PATENT DOCUMENTS

| | | |
|---|---|---|
| 2,635,994 A | 4/1953 | Tierman |
| 2,957,756 A | 10/1960 | Bacon |
| 3,009,783 A | 11/1961 | Sheer et al. |
| 3,172,774 A | 3/1965 | Diefendorf |
| 3,317,354 A | 5/1967 | Darrow et al. |
| 3,931,704 A * | 1/1976 | Tominaga et al. ............ 423/446 |
| 4,132,671 A | 1/1979 | Deininger et al. |
| 4,167,444 A | 9/1979 | Schweiger |
| 4,321,334 A * | 3/1982 | Chatterjee ............ 524/579 |
| 4,435,375 A | 3/1984 | Tamura et al. |
| 4,435,378 A | 3/1984 | Reck et al. |
| 4,767,608 A | 8/1988 | Matsumoto et al. |
| 4,915,977 A | 4/1990 | Okamoto et al. |
| 4,922,827 A | 5/1990 | Remo |
| 5,114,477 A | 5/1992 | Mort et al. |
| 5,132,105 A | 7/1992 | Remo |
| 5,227,038 A * | 7/1993 | Smalley et al. ............ 204/173 |
| 5,234,474 A | 8/1993 | Whewell |
| 5,273,729 A * | 12/1993 | Howard et al. ............ 423/445 B |
| 5,294,732 A * | 3/1994 | Chiang et al. ............ 560/86 |

FOREIGN PATENT DOCUMENTS

| | | |
|---|---|---|
| DE | 2414215 | 1/1976 |
| GB | 2 101 983 A | 2/1983 |
| JP | 2 221 194 | 2/1989 |
| JP | 2 160 696 | 6/1990 |
| RU | 1587000 | 8/1990 |
| SU | 1587000 * | 8/1990 |

OTHER PUBLICATIONS

Kroto, H.W., et al., "Co: Buckminsterfullerene", Nature, vol. 318, Nov. 14, 1985, pp. 162-163.*

(Continued)

*Primary Examiner* — Dah-Wei Yuan
(74) *Attorney, Agent, or Firm* — Cooley LLP

(57) ABSTRACT

$C_{60}$ and $C_{70}$ carbon atom compounds are prepared by evaporating graphite in an inert quenching gas. The vapor of carbon is collected and is selectively extracted with an organic non-polar solvent.

39 Claims, 4 Drawing Sheets

OTHER PUBLICATIONS

Kratschmer, W., et al. "The Infrared and ultraviolet Absorption Spectra of Laboratory-Produced carbon dust", Chem.Phys.Lett; vol. 170, #2-3, Jul. 6, 1990, (pp. 167-170).*
Buseck, P.R., et al. "Fullerenes From a Geological Environment", Science, vol. 257, Jul. 10, 1992, 215-217.*
Kratschmer, W., et al., "Spectroscopy of Matrix-Isolated Carbon Cluster Molecules", *Surface Science*, vol. 156, (1985), pp. 814-821.*
Day, K., et al. "measured Extinotion Efficiency of Graphite Smoke in the Region 1200-6000 A", Nature-Phys. Sci., vol. 243, pp. 50-51 (1973).*
Fang et al., "Evidence for fullerene in a coal of Yunnan, Southwestern China", Mat. Res. Innovat. (1997), pp. 130-132.*
Osawa et al., "Survey of Natural Fullerenes in Southwestern China", pp. 421-424 in Nanonetwork Materials, edited by S. Saito et al., 2001, American Institute of Physics.*
Kappler et al., J. Appl. Phys. 50 (1), 1979, pp. 308-316.*
Kratschmer et al., "Search for the UV and IR Spectra of C60 in Laboratory-Produced Carbon Dust," in Dusty Objects in the Universe (Netherlands, Kluwer Academic Publishers, 1990, E. Bussoletti and A.A. Vittone (eds.)), pp. 89-93).*
J. Lefevre, "Investigation of Iron and Carbon Dusts," Annales D'Astrophysique, vol. 30, No. 4, pp. 731-738, 1967.*
Translation for J. Lefevre, "Investigation of Iron and Carbon Dusts," Annales D'Astrophysique, vol. 30, No. 4, pp. 731-738, 1967.*
Liu et al., "Experimental Results on High Yield C70 Fullerene," Chin. Phys. Lett., vol. 11, No. 10 (1994), pp. 609-610.*
Rietmeijer et al., "C60 and Giant Fullerenes in Soot Condensed in Vapors with Variable C/H2 Ratio", Fullerenes, Nanotubes, and Carbon Nanostructures, vol. 12, No. 3, pp. 659-680, 2004.*
"Macroscopic." Hackh's Chemical Dictionary, 400, 4th ed., 1969.*
"Macroscopic." The American Heritage Dictionary of the English Language, 781 (William Morris ed., New College ed. 1976).*
Liu et al. ,"Noncovalent surface modification of carbon nanotubes for solubility in organic solvents," Carbon, vol. 44 (2006), pp. 1613-1616.*
Chen et al. , "Solution Properties of Single-Walled Carbon Nanotubes," Science 282, (1998), pp. 95-98.*
S. Iijima, "Helical microtubules of graphitic carbon," Nature, vol. 354, No. pp. 56-58, 1991.*
Definition of "fullerene" from the Concise Encyclopedia of Science and Technology, 3rd ed., Sybil P. Parker, ed., McGraw Hill, p. 819 (1994).*
Definition of "fullerene" from the Kirk-Othmer Encyclopedia of Chemical Technology, John Wiley & Sons, Inc., vol. 12, pp. 228-258, especially p. 232 (2009).*
Definition of "moiety" from the McGraw-Hill Dictionary of Scientific and Technical Terms, 4th ed., 1989.*
Kroto et al., "C60: Buckminsterfullerene," Chem. Rev. 91 (1991), pp. 1213-1235.*
H. W. Kroto,"The stability of the fullerenes Cn, with n=24, 28, 32, 36, 50, 60, and 70," Nature (1987) vol. 329, pp. 529-531.*
Hu et al., "Bond order bond polarizability model for fullerene cages and nanotubes," J. Chem. Phys., vol. 123, issue 21 (2005), 214708.*
"Fullerene." Encyclopaedia Britannica's Guide to the Nobel Prizes. [online], 2010. [retrieved on Sep. 27, 2010]. Retrieved from the Internet: <URL: http://www.britannica.com/nobelprize/article-9002185>.*
Karthikeyan et al., "Large Scale Synthesis of Carbon Nanotubes," E-Journal of Chemistry, 6(1), pp. 1-12 (2009) [online]. [retrieved on Sep. 27, 2010]. Retrieved from the Internet: <URL: http://www.e-journals.net>.*
D.M. Ugarte, "Novel Graphitic Structures: Fullerenes, Nanotubes, and Onions," [online], 1994. [retrieved on Sep. 27, 2010]. Retrieved from the Internet: <URL: http://www.fondationlatsis.org/plpdf/Prix_Latsis/EPFL_1994.pdf>.*
M.S. M S Dresselhaus, "Carbon-Based Nanostructures," [online]1998, WTEC Hyper-Librarian [retrieved on Sep. 27, 2010]. Retrieved from the Internet: <URL: http://www.wtec.org/loyola/nano/us_r_n_d/09_02.htm>.*

Wu et al., "Computationally designed families of flat, tubular, and cage molecules assembled with "starbenzene" building blocks through hydrogen-bridge bonds," Chemistry, vol. 16, No. 4 (2010), pp. 1271-1280.*
J.Y. Kang, "A Review of the Emerging Nanotechnology Industry: Materials, Fabrications, and Applications," Department of Toxic Substances Control, [online] Sep. 2010. [retrieved on Sep. 27, 2010]. Retrieved from the Internet: <URL:http://www.dtsc.ca.gov/TechnologyDevelopment/Nanotechnology/upload/Review_of_Emerging_Nanotech_Industry.pdf >.*
A. Perez-Garrido, "Numerical study of shapes of fullerenes with symmetrically arranged defects," J. Phys.: Condens. Matter 14 (2002), pp. 5077-5082.*
Liang et al. ,"Primary Investigation of the Possible Occurrence of Geological Fullerene (C60) in the Coal Seams and Their Wall Rocks Located in Lufeng of Southwestern China," Acta Petrologica Sinica, 18(3), pp. 419-423 (2002).*
English translation of Liang et al., "Primary Investigation of the Possible Occurrence of Geological Fullerene (C60) in the Coal Seams and Their Wall Rocks Located in Lufeng of Southwestern China," Acta Petrologica Sinica, 18(3), pp. 419-423 (2002).*
Rietmeijer, Frans, ed. , Natural Fullerences and Related Structures of Elemental Carbon (Developments in Fullerene Science), Netherlands, Springer, 2006), back cover.*
Taylor et al., "There Are No Fullerenes in the K-T Boundary Layer," Fullerene Science and Technology, 8 (1&2), pp. 47-54 (2000).*
Aihara et al., Spherical Aromaticity of Buckminsterfullerene, *Bull. Chem. Soc. Jpn.*, 1988, pp. 2657-2659.
Akhter, et al., The Structure of Hexane Soot II: Extraction Studies, *Applied Spectroscopy*, 39(1), 1985, pp. 154-167.
Almlof et al., Theoretical Methods and Results for Electronic Structure Calculations on Very Large Systems Carbon Clusters, *ACS Symposium Series*, 353, 1987, pp. 35-48.
Amato, A First Sighting of Buckyballe in the Wild, *Science*, 257(5067), 1992, p. 167.
Amic et al. On the Lack of Reactivity of Buckminsterfullerene: A Theoretical Study, *J. Chem. Soc. Perkin Trans.*, 1990, pp. 1595-1598.
Bacon, R., *J. Applied Physics*, 31(2), 1960, pp. 283-290.
Balasubramanian et al., Computer Generation of Spectra of Graphs:Applications to $C_{60}$ Clusters and Other Systems, *Journal of Computational Chemistry*, 9(4), 1988, pp. 406-415.
Ballester et al., Atoms in Carbon Cages as a Source of Interstellar Diffuse Lines *The Astrophysical Journal*, 356, 1990, pp. 507-512.
Blau et al., An Investigation of the Microfrictional Behavior of $C_{60}$ Particle Layers on Aluminum, *Thin Solid Films*, 219, 1993, pp. 129-134.
Bloomfield et al., Negative and Positive Cluster Ions of Carbon and Silicon, *Chemical Physics Letters*, 121(1) (2), 1985, pp. 33-37.
Bochvar et al., Problems in the Structural Chemistry of Crystalline Carbon, *Sov. Sci. Rev. B. Chem.*, 9, 1987, pp. 483-527.
Brendsdal et al., Normal Coordinate Analysis of "Footballene" $C_{60}$ *Specroscopy Letters*, 21(4), 1988, pp. 313-318.
Brendsdal, Symmetry Coordinates of Molecular Vibrations of "Footballene" $C_{60}$, *Spectroscopy Letters*, 21(4), 1988, pp. 319-339.
Brendsdal et al., Kekule Structures of Footballene, *Jounrnal of Molecular Structure (Theochem)*, 1989, pp. 55-66.
Brown, High Symmetries in Quantum Chemistry, *Chemical Physics Letters*, 136(2), 1987, pp. 128-133.
Buseck et al., Fullerenes from the Geological Environment, *Science*, 257(5067), 1992, pp. 215-217.
Bussoletti, Dusty Objects in the Universe, pp. 89-93.
Campbell et al., An Intense, Simple Carbon Cluster Source, *J. Chem. Phys.*, 93 (9), 1990, pp. 6900-6907.
Caulemans et al., SO(4) Symmetry and the Static Jahn-Teller Effect in Icosahedral Molecules, *Physical Reviw A* , 39(2), 1989, pp. 481-493.
Ceulemans et al., The Jahn-Teller Instability of Fivefold Degenerate States in Icosahedral Molecules, *J. Chem. Phys.*, 93(2), 1990, pp. 1221-1234.
Coulantbeau et al., Calculs.de Proprietes Electroniques et des Frequences Normales de Vibration D'Agregats Carbones Formant Des Polyedres Reguliers et Semi-Reguliers, *Journal de chimie physiuque*, 84, 1987, pp. 7-8.

Cox et al., $C_{60}$La:A Deflated 4 Soccer Ball?, *J. Am. Chem. Soc.*, 108, 1986, pp. 2457-2458.

Cox et al., Carbon Clusters Revisited:The "Special" Behavior of $C_{60}$ and Large Carbon Clusters, *J. Chem. Phys.*, 88(3), 1988, pp. 1588-6907.

Creasy, Some Model Calculations of Carbon Cluster Growth Kinetics, *J. Chem. Phys.*, 92(12), 1990, pp. 7223-7233.

Creasy et al., Large Carbon Cluster Ion Formation by Laser Ablation of Polyamide and Graphite, *Chemical Physics*, 126, 1988, pp. 453-468.

Creasy et al., Formation of High Mass Carbon Cluster Ions from Laser Abiation of Polymers and Thin Carbon Films, *J. Chem. Phys.*, 92(4), 1990, pp. 2269-2277.

Curl et al., Probing $C_{60}$, *Science*, 242, 1988, pp. 1017-1022.

Curl et al., Fullerenes, *Scientific America*, 1991, pp. 54-64.

Cyvin et al., Molecular Vibrations of Footballene, *Chemical Physics Letters*, 143(4), 1988, pp. 377-380.

Daniel, Jr., Studies Toward a Convergent Synthesis of $C_{60}$, *Dissertion Abstracts International*, 49(5), 1988, p. 1706-B.

Dias, A Facile Huckel Molecular Orbital Solution of Buckminsterfullene Using Chemical Graph Theory, *Journal of Chemical Education*, 66(12), 1989, pp. 1012-1015.

Dietz et al., Laser Production of Supersonic Metal Cluster Beams, *J. Chem. Phys.*, 74(1), 1981, pp. 6511-6512.

Disch et al., On Symmetrical Clusters of Carbon Atoms:$C_{60}$, *Chemical Physics Letters*, 125(5) (6), 1986, pp. 465-466.

Ebbesen, et al., Origins of Fullerenes in Rocks, *Science*, 268, 1995, pp. 1634-1635.

Elser et al., Magnetic Behavior of Icosahedral C60, *Physics Review of General Physics Third Series*, 36(10), 1987, pp. 4579-4585.

Elser et al., Icosahedral $C_{60}$:An Aromatic Molecule with a Vanishingly Small Ring Current Magnetic Susceptibility, *Nature*, 325, 1987, pp. 792-794.

Feld et al., Carbon Cluster Emission from Polymers Under Kiloelectronvolt and Magaelectronvolt Ion Bombardment, *J. Phys. Chem.*, 94, 1990, pp. 4595-4599.

Feng et al., Quantum-Chemical Invetigation of Buckminsterfullerene and Related Carbon Clusters (I): The Electronic Structure and UV Spectra of Buckminsterfullerene and Other $C_{60}$ Cages, *International Journal of Quantum Chemistry*, XXXVII, 1990, pp. 509-607.

Fowler et al., π-Systems in Three Dimensions, *Chemical Physics Letters*, 127(1), 1986, pp. 78-83.

Fowler, Carbon Cylinders:A Class of Closed-shell Clusters, *J. Chem. Soc. Faraday Trans.*, 86(2), 1990, pp. 2073-2077.

Fowler, How Unusual is $C_{60}$? Magic Numbers for Carbon Clusters, *Chemical Physics Letters*, 131(6), 1986, pp. 444-450.

Fowler et al., Systematics of Bonding in Non-Icosahedral Carbon Clusters, *Theor. Chim. Acta*, 73, 1988, pp. 1-26.

Fowler et al., Electric and Magnetic Properties of the Aromatic Sixty-Carbon Cage, *Chemical Physical Letters*, 165(1), 1990, pp. 79-86.

Fowler et al., The Leapfrog Principle:A Rule for Electron Counts of Carbon Clusters, *J. Chem. Soc., Chem. Commun.*, 1987, pp. 1403-1405.

Gerhardt et al., Polyhedral Carbon Ions in Hydrocarbon Flames *Chemical Physical Letters*,137(4), 1987, pp. 306-310.

Gerhardt et al., The Formation of Polyhedral Carbon Ions in Fuel-Rich Acetylene and Benzene Flames, Twenty-Second Symposium (International) on Combustion/The Combustion Institute, 1988, pp. 395-401.

Gerhardt et al., Large Ionic Species in Sooting Acetylene and Benzene Flames, Agard Proc. No. 422, Combustion and Fuels in Gas Turbine Origins, 1988, p. 22-1-22-11.

Gerhardt et al., Polyhedral Carbon Ions in Hydrocarbon Flames, *Chemical Physics Letters*, 137(4), 1987, 306-310.

Gerhardt et al., The Formation of Polyhedral Carbon Ions in Fuel-Rich Acetylene and Benzene Flames, Twenty-Second Symposium (International) on Combustion/The Combustion Institute, 1988, pp. 395-401.

Geusic et al., Photodissociation of Carbon Cluster Cations, *J. Chem. Phys.*, 86 (7), 1987, pp. 3862-3869.

Haddon, Measure of Nonplanarity in Conjugated Organic Molecules:Which Structurally Characterized Molecule Displays the Highest Degree of Pyramidalization?, *J. Am. Chem. Soc.*, 112, 1990, pp. 3385-3389.

Haddon et al., Electronic Structure and Bonding in Icosahedral $C_{60}$, *Chemical Physics Letters*, 125(5) (6), 1986, pp. 459-464.

Haddon et al., Icosahedral $C_{60}$ Revisitcd:An Aromatic Molecule with a Vanishingly Small Ring Current Magnetic Susceptibility, *Chemical Physics Letters*, 169(4), 1990, pp. 362-364.

Haddon et al., Rehybridization and π-Orbital Alignment: The Key to the Existence of Spheroidal Carbon Clusters, *Chemical Physics Letters*, 131(3), pp. 165-169.

Hahn et al., Magic Numbers in $C^+_N$ and $C_N$ Abundance Distributions, *Chemical Physics Letters*, 130(1) (1), 1986, pp. 12-16.

Hale, Discrete-Variational-X Alpha Electronic Structure Studies of the Spherical $C_{60}$ Cluster:Prediction of Ionization Potential and Electronic Transition Bnergy, *J. Am. Chem. Soc.*, 108, 1986, pp. 6087-6088.

Harano et al., Decomposition of Gaseous Hydrocarbons in a Laser-induced Plasma as a Novel Carbonaceous Source for Cluster Formation, *Chemical Physics Letters*, 172 (3) (4), 1990, pp. 219-223.

Hargittai et al., Quasicrystals, Networks and Molecules of Fivefold Symmetry, pp. 239-287.

Harter et al., Rovibrational Spectral Fine Structure of Icosahedral Molecules, *Chemical Physics Letters*, 132 (4) (5), 1986, pp. 387-392.

Harter et al., Rotation-Vibration Spectra of Icosahedral Molecules. I. Icosahedral Symmetry Analysis and Fine Structure, *J. Chem. Phys.* 90(9), 1089, pp. 4727-4743.

Hayden et al., π Bonding in the Icosahedral $C_{60}$ Cluster, *Physical Review B*, 36(9), 1987, pp. 5010-5015.

Haymet, $C_{120}$ and $C_{60}$: Archimedean Solids Constructed from $sp^2$ Hybridized Carbon Atoms, *Chemical Physics Letters*, 122(5), 1985, pp. 421-424.

Haymet, Footballene:A Theoretical Prediction for the Stable, Truncated Icosahedral Molecule $C_{60}$, *J. Am. Chem. Soc.*, 108, 1986, pp. 319-321.

Heath, The Formation of Long Carbon Chain Molecules during Laser Vaporization of Graphite, *J. Am. Chem. Soc.*, 109, 1987, pp. 359-363.

Heath et al., Long Carbon Chain Molecules in Circumstellar Shells, *The Astrophysical Journal*, 314, 1987, pp. 352-355.

Heath et al., Lanthanum Complexes of Spheroidal Carbon Shells, *J. Am. Chem. Soc.*, 107, 1985, pp. 7779-7780.

Heath et al., The UV Absorption Spectrum of $C_{60}$ (buckminsterfullerene):A Narrow Band at 3860 A, *J. Chem. Phys.*, 87(7), 1987, pp. 4236-4238.

Hecht, . . . and shower the Earth with buckyballs, *Science*, 1994, pp. 16.

Hess, Jr. et al., The Stability of Footballene, *J. Org. Chem.*, 1986, pp. 3902-3903.

Heymann, et al., Fullerenes in the Cretaceous-Tertiary Boundary Layer, *Science*, 265, 1994, pp. 645-647 Heymann, Buckminsterfullerene, its Siblings, and Soot, Carriers of Trapped Inert Gases in Meteorites?, *Proceedings of the Seventeenth Lunar and Planetary Science Conference, Part 1, Journal of Geophysical Research*, 91 (B13), 1986, pp. E135-E138.

Huffman, Methods and Difficulties in Laboratory Studies of Cosmic Dust Analogues, in *Experiments on Cosmic Dust Analogues*, Edited by Bussoletti et al., 1988, pp. 25-42.

Hollow Molecules, *New Scientist*, 1966, pp. 118-119.

Howard et al., Fullerenes $C_{60}$ and $C_{70}$ in Flames, *Letters to Nature*, 352, 1992, pp. 139-141.

Huffman, D., et al., *Nature (Phys. Sci)*., 243, 1973, pp. 50-51.

Huffman, D., "Methods and Difficulties in Laboratory Studies of Cosmic Dust Analogues", in book "Experiments on Cosmic Dust Analogues", Bussoletti, E., Editor, Kluwer Academic Publishers, Boston MA, 1988, pp. 25-42.

Iijima, The 60-Carbon Cluster Has Been Revealed?, *J. Phys. Chem.*, 91, 1987, pp. 3466-3467.

Jelski et al., Clusters:Link Between Molecules and Solids, *Journal of Chemical Education*, 65(10), 1988, pp. 879-883.

Jiang et al., Stability and Reactivities Based on Moment Analysis *Theor. Chim. Actra*, 75, 1989, pp. 279-297.

Joblin et al., Detection of Diffuse Interstellar Bands in the Infrared, *Nature*, 346, 1990, pp. 729-731.

Kaldor et al., Molecular Surfaces:Chemistry and Physics of Gas Phase Clusters, Microclusters:Proceedings of the First NEC Symposium, 1987, pp. 96-106.

Kaldor et al., The Basics of Molecular Surfaces, *Chemtech*, 1987, pp. 300-307.

Kamo, Mutsukazu et al., Diamond Synthesis from Gas Phase in Microwave Plasma, *Journal of Crystal Growth*, 62, 1983, pp. 642-644.

Kappler, P., "Fine Carbon Particle Formation by Carbon Vapor Condensation", *J. Applied Phys.*, 50(1), 1979, pp. 308-316.

Kataoka et al., Geometrical Structures and Spectra of Corannulene and Icosahedral $C_{60}$ Tetrahedron, 42(23), pp. 6437-6442.

Keller, Der C60 Cluster Pootballen oder Buckminsterfullerene, *GIT, Fachz, Lab*, 31, 1987, pp. 619-623.

Kirk-Othmer, Encyclopedia of Chemical Technology, Third Edition, vol. 4, Blood, Coagulants and Anticoagulants to Cardiovascular Agents, pp. 652-653.

Klein et al., Icosahedral Symmetry Carbon Cage Molecules, *Nature*, 323, 1986, pp. 703-706.

Klein et al., Resonance in $C_{60}$ Buckminsterfullerene, *J. Am. Chem. Soc.*, 108, 1986, pp. 1301-1302.

Kovaoevic, et al., On the Hybridization in Some Archimedean Carbon Clusters, *International Journal of Quantum Chemistry Symposium 21*, 1987, pp. 589-593.

Kratschmer, W., et al., "Search for the UV and IR Spectra of $C_{10}$..." in Dusty Objects in the Universe:Proceedings of the 4th Int. Workshop of the Astron. Observatory held at Capri, Italy, 1989.

Kratschmer et al., The Infrared and Ultraviolet Absorption Spectra of Laboratory-Produced Carbon Dust:Evidence for the Presence of the $C_{60}$ Molecule, *Chemical Physics Letters*, 170(2) (3), 1990.

Kratschmer, W., et al., *Chem. Phys. Lett.*, 170(2) (3), 1990, pp. 167-170.

Kratschmer, W., et al. *Surface Science*, 156, 1985, pp. 814-821.

Kratschmer and No. Sorg, Spectroscopy of Matrix-Isolated Carbon Cluster Molecules Between 200 and 850 nm Wavelength, *Surface-Science*, 156, 1985, pp. 814-821.

Kratschmer et al., Search for the UV and IR Spectra of $C_{60}$ in Laboratory-Produced Carbon Dust, *Dusty Objects in the Universe*, 1990, pp. 89-93.

Kroto, The Formation and Structure of Circumatellar and Interstellar Dust, Carbon in the Galaxy:Studies from Earth and Space, *NASA Conference Publication 3061*, pp. 275-284.

Kroto at al., The Formation of Quasi-Icosahedral Spiral Shell Carbon Particles, *Nature*, 331, 1988, pp. 328-331.

Kroto at al., $C_{60}$:Buckminsterfullerene, *Nature*, 318, 1985, pp. 162-163.

Kroto, Giant Fullerenes, *Chemistry in Britain*, 1980, pp. 40-45.

Kroto, The Chemistry of the Interstellar Medium, *Phil. Trans. R. Soc. Land. A*, 325, 1988, pp. 405-421.

Kroto et al., C60: Buckminsterfullerene, *Nature*, 318, 1985, pp. 162-163.

Kroto, $C_{60}$ Fullerences, Giant Fullerenes and Soot, *Pure & Appl. Chem.*, 62(3), 1990, pp. 407-415.

Kroto, Giant Fullerenes, *Chemistry in Britain*, 1990, pp. 40-43.

Kroto, The Role of Linear and Spheroidal Carbon Molecules in Interstellar Grain Formation, *Ann. Phvs. Fr.*, 14, 1989, pp. 169-179.

Kroto, The Stability of the Fullerenes $C_o$, with n=24, 28, 32, 36, 50, 60 and 70, *Nature*, 329, 1987, pp. 529-531.

Kroto, Space, Stars, C60 and Soot, *Science*, 242, 1988, pp. 1139-1145.

Kroto, Chains and Grains in Interstellar Space, Polycyclic Aromatic Hydrocarbons and Astrophysics, pp. 197-206.

Kurihara, et al., High rate synthesis of diamond by dc plasma jet chemical vapor deposition, *Appl. Phys. Lett.*, 52(6), 1988, pp. 437-438.

Larsson et al., Optical Spectrum of the Icosahedral C60- "Fullerene-60", *Chemical Physical Letters*, 137(6), 1987, pp. 501-503.

Laszlo et al., A Study of the UV Spectrum of the Truncated Icosahedral $C_{60}$ Molecule, *Journal of Molecular Structure (Theochem)*, 183, 1989, pp. 271-278.

Laszlo et al., On the Geometrical Structure and UV Spectrum of the Truncated Icosahedral $C_{60}$ Molecule, *Chemical Physics Letters*, 136(5), 1987, pp. 418-422.

Lefeure, J., Etude de Poussieres de Fer et de Carbone, Tome 30, Annee 1967, Fasc. 4, pp. 731-738.

Lefevre, An Experimental Study of the Dust of Iron, Carbon, Silicon Carbide and Silica, *Astron, & Astrophys.*, 5(1), 1970, pp. 37-44.

Lefevre, J., *Astron. Aetrophys.*, 5, 1970, p. 37 and pp. 39-44.

Leger et al., Remarkable Candidates for the Carrier of the Diffuse Interstellar Bands:$C_{60}$+ and other Polyhedral Carbon Ions, *Astron, Astrophys.*, 203, 1988, pp. 145-148.

Leger et al., Identification of the "Unidentified IR Emission Features of Interstellar Dust?", *Astron, Astrophys.*, 137, 1986, pp. L5-L8.

Lineman et al., High Mass Carbon Clusters from Aromatic Hydrocarbons Observed by Laser Mass Spectrometry, *J. Phys. Chem.*, 93, 1989, pp. 5025-5026.

Liu et al., Negative Carbon Cluster Ion Beams:New Evidence for the Special Nature of $C_{60}$, *Chemical Physics Letters*, 126(2), 1986, pp. 215-217.

Loffler et al., Polyhedral Carbon Ions in Hydrocarbon Flames, *Chemical Physics Letters*, 137(4), 1987, pp. 306-310.

Luthi et al., Ab Initio Studies on the Thermodynamic Stability of the Icosahedral $C_{60}$ Molecule "Buckminsterfullerene", *Chemical Physics Letters*, 135(4) (5), 1987, pp. 357-360.

Leger et al., Remarkable Candidates for the Carrier of the Diffuse Interstellar Bands:$C_{60}$+ and Other Polyhedral Carbon Ions, *Astron. Astrophys.*, 203, 1988, pp. 145-148.

Leger et al., Identification of the "Unidentified IR Emission Features of Interstellar Dust?", *Astron. Astrophys.*, 137, 1986, pp. L5-L8.

Lineman et al., High Mass Carbon Clusters from Aromatic Hydrocarbons Observed by Laser Mass Spectrometry, *J. Phys. Chem.*, 93, 1989, pp. 5025-5026.

Liu et al., Negative Carbon Cluster Ion Beams:New Evidence for the Special Nature of $C_{60}$, *Chemical Physics Letters*, 126(2), 1986, pp. 215-217.

Loffler et al., Polyhedral Carbon Ions in Hydrocarbon Flames, *Chemical Physics Letters*, 137(4), 1987, pp. 306-310.

Luthi et al., Ab Initio Studies on the Thermodynamic Stability of the Icosahedral $C_{60}$ Molecule "Buckminsterfullerene", *Chemical Physics Letters*, 135(4) (5), 1987, pp. 357-360.

Marynick et al., Localized Molecular Orbitals and Electronic Structure of Buckminsterfullerene, *Chemical Physics Letters*, 132(4) (5), pp. 383-386.

Matsumoto, Chemical vapour deposition of diamond in RF glow discharge, *Journal of Materials Science Letters*, 4, 1985, pp. 600-602.

Matsumoto et al., Synthesis of diamond films in a rf induction thermal plasma, *Appl. Phys. Lett.*, 51(10), 1987, pp. 737-739.

Matsumoto et al., Growth of diamond particles from methane-hydrogen gas, *Journal of Materials Science*, 17, 1982, pp. 3106-3112.

McElvany et al., FIMS Studies of Mass-Selected, Large Cluster Ions Produced by Direct Laser Vaporization, *Chemical Physics Letters*, 134(3), 1987, pp. 214-219.

McElvany et al., Ion-Molecule Reaction Studies of Mass Selected Carbon Cluster Ions Formed by Laser Vaporization, *J. Chem. Phys.*, 85(1), 1986, pp. 632-633.

McKee et al., Calculated Properties of $C_{60}$ Isomers and Fragments, *Journal of Molecular Structure* (Theochem.), 153, 1987, pp. 75-84.

Miller, Buchminsterfullerene-A Molecular Material for the Future?, *Adv. Mater. 3*, 5, 1991, pp. 262-265.

Negri et al., Quantum-Chemical Investigation of Franck-Condon and Jahn-Teller Activity in the Electronic Spectra of Buckminsterfullerene, *Chemical Physics Letters*, 144(1), 1988, pp. 31-36.

Newton et al., Stability of Buckminsterfullerene and Related Carbon Clusters, *J. Am. Chem. Soc.*, 108, 1986, pp. 2469-2470.

O'Brien et al., A Reply to Magic Numbers in Cn+ and Cn− Abundance Distributions Based on Experimental Observations, *Chemical Physics Letters*, 132(1), 1986, pp. 99-102.

O'Brien et al., Photophysics of buckminster-fullerene and other carbon cluster ions, *J. Chem. Phys.*, 88(1), 1988, pp. 220-230.

O'Keefe et al., Production of Large Carbon Cluster Ions by Laser Vaporization, *Chemical Physics Letters*, 130(1) (2), 1986, pp. 17-19.

Ozake et al., On Electronic States and Bond Lengths of the Truncated Icosahedral $C_{60}$ Molecule, *Chemical Physics Letters*, 127(3), 1986, pp. 242-244.

Paquette, Dodecahedranes and Allied Spherical Molecules, *Chem. Rev.*, 1989, pp. 1051-1065.

Parent et al., Investigations of Small Carbon Cluster Ion Structures by Reactions with HON, *J. Am. Chem. Soc.*, 111, 1989, pp. 2393-2401.

Pussoletti et al., Experiments on Cosmic Dust Analogues *Proceedings*, 149, pp. 25-42.

Rabilizirov, The Role of Cavities and Mantles in the Ultraviolet Extinction Peak of Graphite Spheres with Particular Reference to a Possibly Discovered $C_{60}$ Structure, *Astrophysics and Space Science*, 125, 1986, pp. 331-339.

Randic et al., On the Aromatic Stability of a Conjugated $C_{60}$ Cluster, *Croatia Chemical ACTA*, 60 (4), 1987, pp. 595-604.

Rohlfing, High Resolution Time-of-Flight Mass Spectrometry of Carbon and Carbonaceous Clusters, *J. Chem. Phys.*, 93(11), 1990, pp. 7851-7662.

Rohlfing, Optical Emission Studies of Atomic, Molecular and particulate Carbon Produced from a Laser Vaporization Cluster Source, *J. Chem. Phys.*, 89(1), 1988, pp. 6103-6112.

Rohlfing et al., Two-Color Pyrametric Imaging of Laser-Heated Carbon Particles in a Supersonic Flow, *Chemical Physics Letters*, 170(1), 1990, pp. 44-50.

Rohlfing et al., Production and characterization of supersonic carbon cluster beams, *J. Chem. Phys.*, 81(7), 1994, pp. 3322-3330.

Rosen et al., Electronic Structure of Spheroidal Metal Containing Carbon Shells:Study of the $LaC_{60}$ and $C_{60}$ Clusters and Their Ions Within the Local Density Approximation, *Z. Phys. D-Atoms, Molecules and Clusters*, 1989, pp. 387-390.

Rosen et al., Optical Spectrum of the Icosahedral C60—"Fullerene-60":A Challenge for Laser Spectroscopy, Laser Spectroscopy VIII, Proceedings of the Eighth International Conference, 1987, pp. 250-253.

Rosen et al., Calculations of the Ionization Thresholds and Electron Affinities of the Neutral, Positively and Negatively Charged $C_{60}$ -"Fullerene-60", *J. Chem. Phys.*, 90(4), 1989, pp. 2525-2526.

Rosen et al., First-Principle Calculations of the Ionization Potentials and Electron Affinities of the Spheroidal Molecules $C_{60}$ and $LaC_{60}$, *J. Am. Chem. Soc.*, 110, 1988, pp. 8701-8703.

Rudzinski et al., Computational Study of Relative Stabilities of $C_{60}$ ($I_h$) and $C_{70}$ ($D_{5h}$)Gas-Phase Clusters, *Thermochimica Acta*, 125, 1988, pp. 155-162.

Rudzinski et al., C60(g) and C70 (g):A Computational Study of the Pressure and Temperature Dependence of Their Populations, *Carbon* 25(6), 1987, pp. 747-750.

Satpahty, Electronic Structure of the Truncated-Icosahedral $C_{60}$ Cluster, *Chemical Physics Letters*, 130 (6), 1986, pp. 545-550.

Schmalz et al., $C_{60}$ Carbon Cages, *Chemical Physics Letters*, 130(3), 1986, pp. 203-207.

Schmalz et al., Elemental Carbon Cages, *J. Am. Chem. Soc.*, 110, 1988, 1113-1127.

Schulman et al., Symmetrical Clusters of Carbon Atoms:The $C_{24}$ and $C_{60}$ Molecules, *Chemical Physics Letters*, 141(1)(2), 1987, pp. 45-48.

Scott et al., Benzene Ring Contractions at High Temperatures, Evidence from the Thermal Interconversions of Aceanthrylene, Acephenanthrylene, and Fluoranthene, *J. Am. Chem. Soc.*, 109, 1987, pp. 5461-5465.

Shibuya et al., Two Icosahedral Structures for the $C_{60}$ Cluster, *Chemical Physics Letters*, 137(1), 1987, pp. 13-16.

Slanina et al., $C_{60}$ (g), $C_{70}$ (g), Saturated Carbon Vapour and Increase of Cluster Populations with Temperature:A Combined Am1 Quantum-Chemical and Statistical-Mechanical Study, *Collection Czecholslavak Chem. Commun.*, 52, 1987, pp. 2831-2839.

Slanina et al., On Relative Stability Reasoning for Clusters of Different Dimensions:An Illustration with the $C_{60}$-$C_{70}$ System, *Thermochimica Acta*, 140, 1959, pp. 87-95.

Slanina et al., Quantum-Chemically Supported Vibrational Analysis of Giant Molecules:The $C_{60}$ and $C_{70}$ Clusters, *Journal of Molecular Structure (Theochem)*, 202, 1989, pp. 169-176.

Smalley, Down-to-Earth Studies of Carbon Clusters, Carbon in the Galaxy:Studies from Earth and Space, *NASA Conference Publication* 3061m, 1990, pp. 199-244.

Smalley, Supersonic Carbon Cluster Beams, In Atomic and Molecular Clusters, E.R. Bernstein Editor of Elsevies, *Science*, 1990, pp. 1-68.

Snow et al., A Search for Interstellar and Circumstellar $C_{60}$, *Astron. Astrophys.*, 213, 1989, pp. 291-294.

So et al., First Observation of Carbon Aggregate Ions>$C_{60}$+ by Laser Desorption Fourier Transform Mass Spectrometry, *J. Phys. Chem.*, 93, 1989, pp. 1184-1187.

Somerville et al., An Astronomical Search for the Molecule $C_{60}$, *Mon. Nat. R. Ast. Soc.*, 240, 1989, Short Communication, pp. 41p-46p.

Spitsyn, B.V., et al., Vapor Growth of Diamond on Diamond and Other Surfaces, *Journal of Crystal Growth*, 52, 1981, pp. 219-226.

Stankevich et al., The Structural Chemistry of Crystalline Carbon:Geometry; Stability, and Electronic Spectrum, *Russian Chemical Reviews*, 53(7), 1984, pp. 640-655.

Stanton et al., Normal Vibrational Modes of Buckminsterfullerene, *J. Phys. Chem.*, 92, 1988, pp. 2141-2145.

Stone et al., Theoretical Studies of Icosahedral $C_{60}$ and Some Related Species, *Chemical Physics Letters*, 128(5) (6), 1986, pp. 501-503.

Taylor et al., Isolation, Separation and Characterization of the Fullerenes $C_{60}$ and $C_{70}$:The Third Form of Carbon, *J. Chem. Soc., Chem. Commun.*, 1990.

Vinokur et al., Measured Extinction Efficiency of Graphite Smoke in the Region 1200-6000A, *Nature Physical Science*, 243, 1973, pp. 50-51.

Wales, Closed-Shell Structures and the Building Game, *Chemical Physics Letters*, 141(6), 1997, pp. 478-484.

Weeks et al., Rotation-Vibration Spectra of Icosahedral Molecules. II. Icosahedral Symmetry, Vibrational Eigenfrequencies, and Normal Modes of Buckminsterfullerene, *J. Chem. Phys.*, 90(9), 1989, pp. 4744-4771.

Weiss et al., Photophysics of Metal Complexes of Spheroidal Carbon Shells, *J. Am. Chem. Soc.*, 110, 1988, pp. 4464-4465.

Weltner, Jr., et al., Carbon Molecules, Ions and Clusters, *Chem. Rev.*, 89, 1989, pp. 1713-1747.

Wilcox, Jr., Extraction with Solvents, *Experimental Organic Chemistry*, pp. 79-80.

Williams, Close Packing of Spheres, *J. Chem. Phys.* 87(7), 1987, pp. 4206-4211.

Wu et al., Vibrational Motions of Buckminsterfullerene, *Chemical Physical Letters*, 137(3), 1987, pp. 291-294.

Yang et al., Ups of buckminsterfullerence and other Large clusters of Carbon, *Chemical Physics Letters*, 139(3) (4), 1987, pp. 233-238.

Yang et al., Ups of a 2-30-atom Carbon Clusters:Chains and Rings, *Chemical Physical Letters*, 144(5) (6), pp. 431-436.

Zhang et al., Reactivity of Large Carbon Clusters:Spheroidal Carbon Shells Their Possible Relevance to the Formation and Morphology of Soot, *The Journal of Physical Chemistry*, 90(4), 1986, pp. 525-528.

P.H. Fang, et al. "Evidence for Fullerene in a Coal of Yunnan, Southwestern China", Mat. Res. Innoval, 1997 1:130-132.

\* cited by examiner

FORM OF CARBON

This is a continuation of U.S. patent application Ser. No. 07/580,246, filed on Sep. 10, 1990, now U.S. Pat. No. 7,494,638, which is a continuation-in-part of U.S. patent application Ser. No. 07/575,254 that was filed on Aug. 30, 1990, now abandoned.

BACKGROUND OF THE INVENTION

This invention relates to new forms of carbon as well as methods for the production and recovery thereof from carbon sources.

In 1985, Kroto et al. postulated the existence of a highly stable molecule composed of 60 carbon atoms based solely on mass spectroscopic analysis of vaporized graphite (H. W. Kroto, et al., *Nature*, Vol. 318, 162, 14 Nov. 1985). More specifically, all that was observed was a peak in the mass spectra of said carbon vapor. However, Kroto et al. did not isolate any of said compound.

A model for this compound was proposed in which 60 carbon atoms are placed at the vertices of a truncated icosahedron forming a perfect "soccerball" structure. Subsequent thereto, many publications have strengthened the evidence for the existence of this molecule. The 60 carbon atom compound (hereinafter $C_{60}$) was presumably produced in situ for the spectroscopic determination reported in these publications. Yet, to date, no one has been successful in verifying the existence of this molecule since no one has been successful in isolating the molecule in measurable amounts. Thus, no processes for producing recoverable amounts of this new compound have been described to the present time.

In the aforesaid publication by Kroto; et al., the authors proposed many uses for the new substance, $C_{60}$ if it could be produced in quantity such as $C_{60}$ transition metal compounds, e.g., $C_{60}Fe$; or halogenated species like $C_{60}F_{60}$ which might be a super lubricant; molecules including oxygen and lanthanum in the $C_{60}$ interior; $C_{60}$ would provide a topologically novel aromatic nucleus for new branches of organic and inorganic chemistry; and $C_{60}$ being especially stable and symmetrical provides possible catalyst and/or intermediate in modelling prebiotic chemistry.

Another form of carbon containing 70 carbon atoms ($C_{70}$) has also been postulated (Kroto, *Chemistry in Britain*, 40-45 (1990), Kroto, *Science*, 1139-1145 (1988)). Like the ($C_{60}$) to date, no one has been successful in verifying the existence of the $C_{70}$. Heretofore, no one has been successful in obtaining the molecule in any appreciable amounts.

SUMMARY OF THE INVENTION

A process has now been developed for the production of recoverable amounts of $C_{60}$ and $C_{70}$. The present new process is accomplished by evaporating carbon rods in an atmosphere of an inert quenching gas maintained at reduced pressure in a reactor therefor. This process produces a sooty carbon product which is graphitic carbon including a few percent of $C_{60}$ and low levels of $C_{70}$ which are recoverable from the product. However, an increase in the fraction of $C_{70}$ molecules can be produced if the pressure is raised to greater than atmospheric pressures.

The recovery process is preferably accomplished by selective extraction of $C_{60}$ and $C_{70}$ with non-polar organic solvents from the sooty graphitic carbon.

The processes of the present invention produces $C_{60}$ and $C_{70}$ in recoverable amounts and permits realization of the proposed uses described hereinbefore.

DESCRIPTION OF THE PREFERRED EMBODIMENTS

Figure 1:
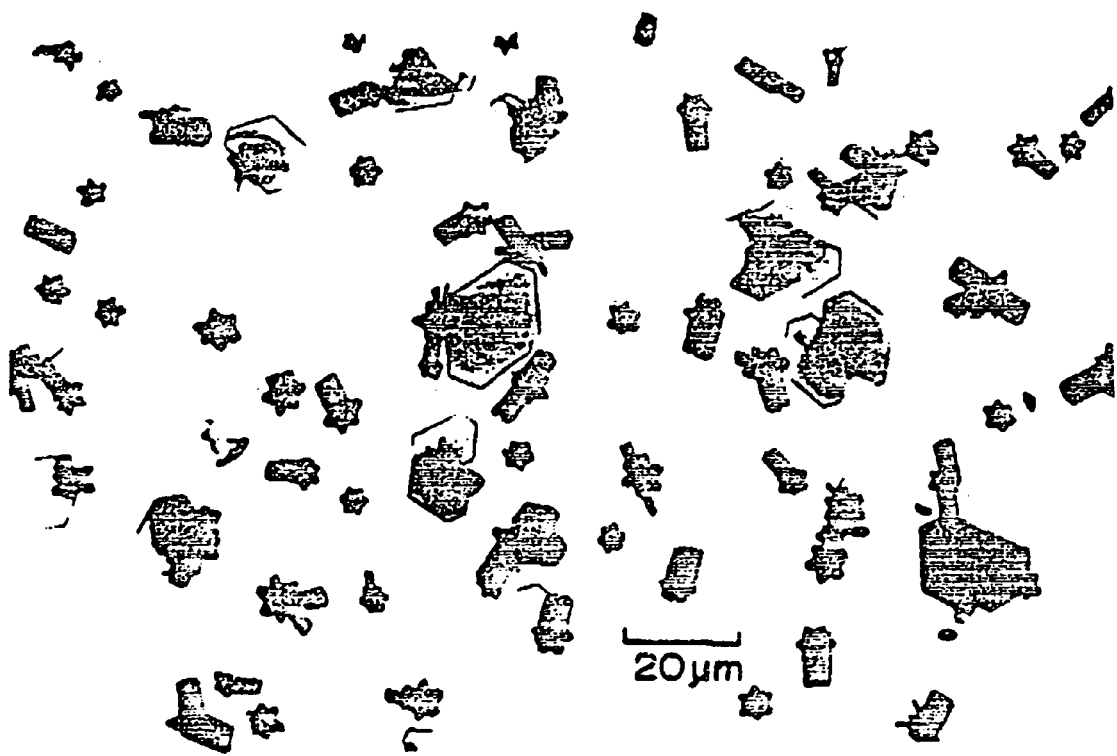
FIG. 1: micrograph of typical crystals of the 98% $C_{60}$, 2% $C_{70}$ material showing thin platelets, rods and stars of hexagonal symmetry.

The first step in the production of $C_{60}$ and $C_{70}$ molecules is vaporizing carbon from any source containing carbon in its various forms, e.g., graphite, amorphous and glassy carbon. It is preferred that this vaporization takes place in an evacuated reactor (e.g., a bell jar). The carbon is vaporized by heating in the presence of an inert quenching gas. The carbon vapor is nucleated in the presence of the inert quenching gas to form smoke particles.

In the production of $C_{60}$ and $C_{70}$, any procedure for vaporizing carbon can be used, although the preferred method relies on the use of a high intensity electrical current with graphite rods as electrodes. These rods are constructed to permit vaporization of carbon at the tip of the rod to produce a high density vapor of carbon.

For best results, the end of one of the rods is reduced in diameter so that the vaporization occurs at the reduced tip. The rods can be prepared using any of the various forms of carbon, such as graphite, amorphous and glassy carbon.

The inert quenching gas can be any of the usual inert gases such as the noble gas. Argon and helium are preferred, the latter being most preferred. Other inert gases commonly employed to provide a non-reactive atmosphere can also be used as quenching gas.

The amount of $C_{60}$ and $C_{70}$ produced from this carbon source is dependent upon the pressure of the quenching gas. At lower pressures relatively pure $C_{60}$ molecules can be produced in high yield with minor concentrations of $C_{70}$. For the production of predominantly $C_{60}$ molecules, the pressure at which the quenching gas is maintained should be subatmospheric and preferably about 50-400 torr. Especially preferred is a pressure of approximately 100 torr. The use of any lower pressure may result in reduced yield of $C_{60}$.

However, as the pressure is raised, the ratio of $C_{70}:C_{60}$ is also increased.

If the pressure is increased to at least two atmospheres, the greatest percentage of $C_{70}$ product is formed. Theoretically, the pressure can be raised to any level just below the point where the reactor would explode from the increased pressure. However, at the higher pressures, the yield of the overall product ($C_{60}$ and $C_{70}$) is reduced even though the ratio of $C_{70}:C_{60}$ is also increased. Therefore, as a practical consideration, the pressure of the quenching gas should not be greater than 10 atmospheres. The preferred pressure for maximizing the amount of $C_{70}$ produced is 2-3 atmospheres.

The produced quenched vapor of carbon, i.e., the smoked particles coats the internal surface of the reactor and of collecting substrates as black soot. These collecting surfaces are inert to the vaporized carbon. They can be transparent and/or coated with an inert metal. Examples include glass, or gold coated glass surfaces and the like. These collecting surfaces are located in the reactor in the path of the carbon smoke. The black coating can be removed by any suitable means, e.g., by scraping the solids from the coated surfaces. The $C_{60}$ and $C_{70}$ molecules can be removed from this collected quenched product by contacting said quenched product with an extracting solvent. In other words, the black soot is placed in a container containing the extracting solvent, or the extracting solvent is poured onto the black soot placed in a container. In either case, the $C_{60}$ and $C_{70}$ molecules become dissolved in the solvent, while the remainder of the black soot remains insoluble. The insoluble material is separated from the solution containing the $C_{60}$ and $C_{70}$ molecules, e.g., by decanting, or by filtration, and the like.

Suitable solvents include non-polar organic solvents, such as the alkanes containing 5-10 carbon atoms (e.g. pentanes, hexanes, heptanes, octanes), benzene and alkyl-benzenes (e.g. toluene, xylene), carbon disulfide, carbon tetrachloride, naphtha,1,1,1-trichloroethane, and the like. Simple solubility determinations using classical laboratory methods will permit selection of other suitable solvents. The preferred solvents are carbon disulfide, benzene, carbon tetrachloride and toluene. Especially preferred are benzene, carbon tetrachloride and carbon disulfide.

The product obtained contains a mixture of $C_{60}$ and $C_{70}$. As described hereinabove, the amounts of $C_{60}$ and $C_{70}$ present is dependent upon the pressure used. If subatmospheric pressures are used, such as 50-400 torr, the product is predominantly pure $C_{60}$ with a minor amount of $C_{70}$ present. Thus, when the collected product is dispersed in the extracting solvent, the product obtained is a mixture of $C_{60}$ and $C_{70}$. For example, when the pressure is 100 torr, the product formed is about 98% $C_{60}$ and about 2% $C_{70}$. This product can be separated from the organic solvent solution by standard methods as by evaporation of the solvent or by dilution of the solvent solution with a non-solvent for $C_{60}$. The product can be crystallized by careful evaporation of the organic solvent or by sublimation procedures.

In a preferred embodiment of producing $C_{60}$ and $C_{70}$, pure graphite rods are vaporized by passing high electrical current (either dc or ac) through narrowed tips of graphite rods. Electron beam, laser and RF heating can be used in lieu of electrical heating. This is done in a reactor (such as a bell jar) that has been evacuated, purged and filled with inert gas at or preferably below atmospheric pressure, e.g., pressures ranging from about 50 to about 400 torr. and even higher. The graphite rods are typically ¼ inch in diameter with about 1 cm length of one rod reduced in diameter to about 5 mm. The electrical heating vaporizes the constricted tip of the graphite rod producing a high density vapor of carbon, which quickly condenses into a smoke consisting of very fine particles (of the order of 0.1 microns) of graphitic carbon with an admixture of a few percent of the desired $C_{60}$ molecule. At this point in the process there is a heavy black coating on collecting substrates and/or on the walls of the chamber which can be easily scraped off for the recovery step.

For recovery, the sooty product is treated with benzene to provide a brownish-red solution. After separation of the undissolved graphitic carbon, the benzene solution is evaporated to obtain microcrystalline product. Alternatively, the product can be sublimed from the sooty carbon at 300° to 400° C. and the sublimation product obtained by condensation on a conventional substrate.

When the pressure of inert quenching gas is 100 torr, the product formed is 98% $C_{60}$ and 2% $C_{70}$. This product, as obtained from the solvent extract of the sooty graphitic carbon, is a dark brown to black crystalline material. When obtained by sublimination in vacuum or inert atmosphere, the product is obtained as a brown to gray coating depending on thickness.

On analysis by mass spectroscopy, the spectrum clearly shows a strong peak at mass 720 amu (i.e., the mass of $C_{60}$) and a clean peak at 840 amu (i.e., the mass of $C_{70}$). Significant differences in the spectra occur only in the abundances in the mass domain lower than 300 amu. Most of these differences seem to originate from the different ionization techniques in the mass spectrometer and from the different kinds of sample desorption. So far, the cleanest mass spectra have been obtained when the material was evaporated and ionized in the vapor phase by electrons. In such spectra the mass range above 40 amu is dominated by the $C_{60}$ mass along with its expected isotope lines. The only other large mass found in any abundance corresponds to $C_{70}$, with a ratio of $C_{70}$ to $C_{60}$ of about 0.02.

Studies by optical microscopy of the $C_{60}$ material which is left after evaporating the benzene solution show a variety of what appear to be crystals—mainly rods, platelets, and star-like flakes. FIG. 1 shows a micro-photograph of such a crystal assemblage. All crystals tend to exhibit six-fold symmetry. In transmitted light they appear red to brown in color; in reflected light the larger crystals have a metallic appearance, whereas the platelets show interference colors consistent with an index of refraction of about 2.

The platelets can be rather thin and thus are ideally suited for electron diffraction studies in an electron microscope. (See the insert in FIG. 2).

Figure 2:
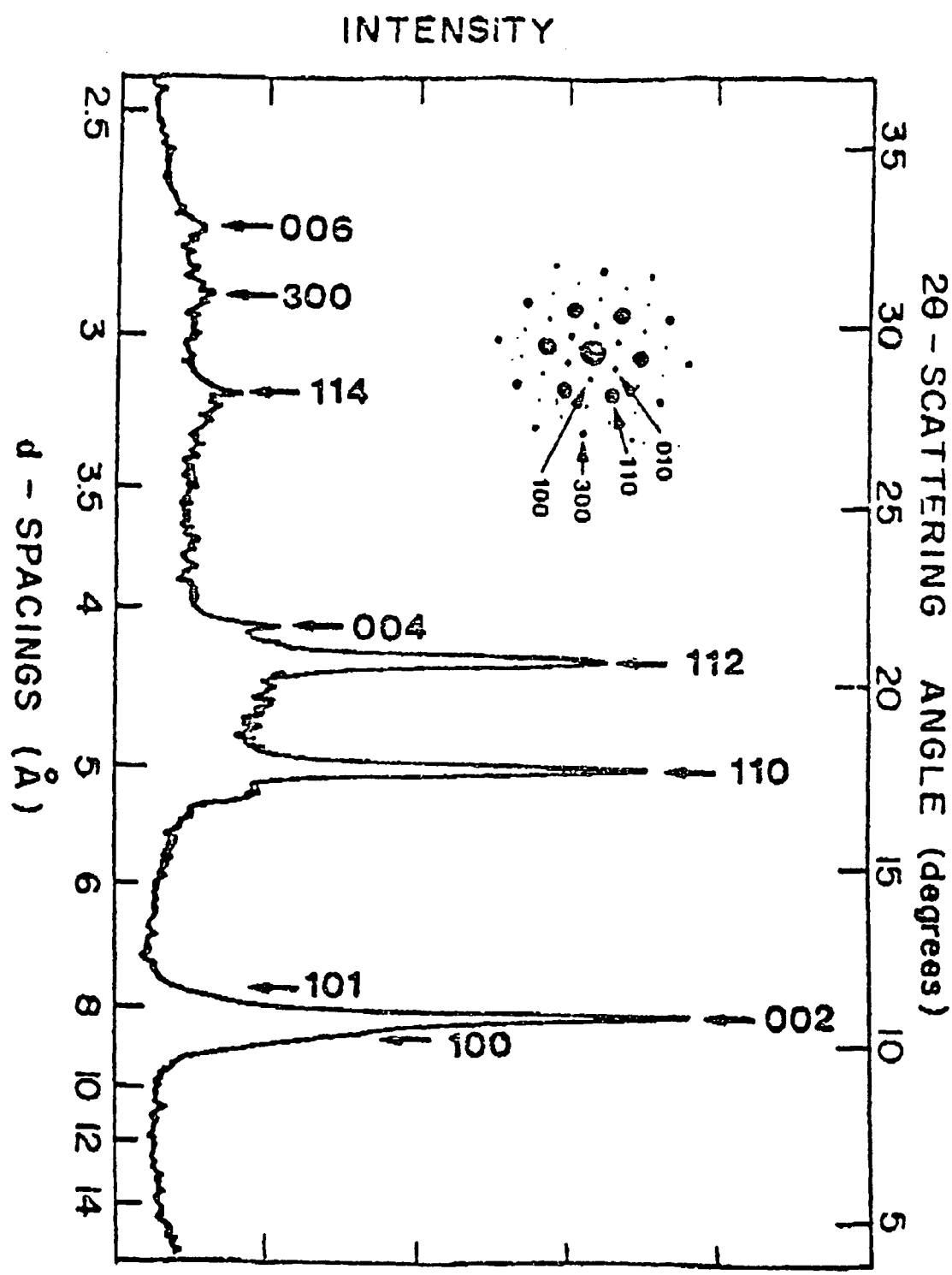
FIG. 2: X-ray diffraction of a microcrystalline powder of the 98% $C_{60}$, 2% $C_{70}$ solid material. Inset at upper left is a single crystal electron diffraction pattern indexed with Miller indices compatible with the X-ray pattern, taken on a thin platelet as in FIG. 1 with the electron beam perpendicular to the flat face.

In order to determine if the $C_{60}$ molecules form a regular lattice electron, x-ray diffraction studies on the individual crystals and on the powder were carried out. A typical X-ray diffraction pattern of the purified $C_{60}$ powder is shown in FIG. 2. To aid in comparing the electron diffraction results with the X-ray results the electron diffraction pattern is inserted into the corner of FIG. 2. From the hexagonal array of diffraction spots indexed as shown in the Figure, a d-spacing of 8.7 Å was deduced corresponding to the (100) reciprocal lattice vector of a hexagonal lattice. The most obvious correspondence between the two types of diffraction is between the 5.01 Å peak of the X-ray pattern and the (100) spot of the electron diffraction pattern, which gives a spacing of about 5.0 Å. Assuming that the $C_{60}$ molecules are behaving approximately as spheres stacked in a hexagonal close packed lattice with a c/a ratio of 1.633, d-spacings can be calculated. The results are shown in Table I.

Table I: X-Ray Diffraction Results and

Assignments For a Hexagonal Lattice Using a=10.02 Å, c=16.36 Å

$$\frac{1}{d^2} = \frac{4(h^2 + hk - k^2) + 2}{3(a^2)c^2}$$

| Measured 2θ (degrees) | Measured d-spacing (Å) | Calculated d-spacing (Å) | Assignment (hkl) |
| --- | --- | --- | --- |
| 10.2 shoulder | 8.7 | 8.68 | (100) |
| 10.81 | 8.18 | 8.18 | (002) |
| | | 7.67 | (101) |
| 17.69 | 5.01 | 5.01 | (110) |
| 20.73 | 4.28 | 4.27 | (112) |
| 21.63 | 4.11 | 4.09 | (004) |
| 28.1 | 3.18 | 3.17 | (114) |
| 30.8 | 2.90 | 2.89 | (300) |
| 32.7 | 2.74 | 2.73 | (006) |

The values derived from this interpretation are a=20.02 Å and c=16.36 Å. The nearest neighbor distance is thus 10.02 Å. For such a crystal structure the density is calculated to be 1.678 g/cm$^3$, which is consistent with a value of 1.65+/−0.05 determined by suspending crystal samples in aqueous $GaCl_3$ solutions of known densities. Although the agreement shown in Table 1 is good, the absence of the characteristically strong (101) diffraction in hcp and the broad continuum in certain regions suggest a less than perfect crystalline order. Furthermore, X-ray diffraction patterns obtained on carefully grown crystals up to 500 micrometers in size with well developed faces yielded no clear spot pattern (in contrast to the electron diffraction pattern on micron-size crystals). It thus appears that these larger crystals do not exhibit long range periodic order in all directions.

A likely explanation for the unusual diffraction lies in the disordered stacking arrangement of the molecules in planes normal to the c-axis. It is well known that the position taken by spheres in the third layer of stacking determines which of the close-packed structures occurs, the stacking arrangement in fcc being ABCABC while that in hop is ABABAB. If the stacking sequence varies, the X-ray lines due to certain planes will be broadened by the disorder while other lines will remain sharp. Such disordered crystalline behavior was observed long ago in the close packed structure of cobalt, where X-ray diffraction lines such as (101), (102) and (202) were found to be substantially broadened due to the stacking disorder. Reflections from planes such as (002) remain sharp since these planes have identical spacings in both fcc and hcp structures. A general expression for which peaks are broadened by this kind of disorder have been given in terms of Miller indices (h,k,l) as h−k=3t±1, l≠0, where t is an integer. None of these broadened reflections are apparent in the X-ray pattern of FIG. 2. This may explain the weakness of the characteristically strong (101) peak. Whether or not this stacking disorder is related to the presence of the possibly elongated $C_{70}$ molecules is yet to be determined.

In small crystals at least, the $C_{60}$ molecules appear to be assembling themselves into a somewhat ordered array as though they are effectively spherical, which is entirely consistent with the soccer ball hypothesis for their structure. The additional diameter over the calculated 7.1 Å value for the carbon cage itself must represent the effective van der Waals diameter set by the repulsion of the pi electron clouds extending outward from each carbon atom. Scanning tunnelling spectroscopy of the $C_{60}$ molecules clearly shows the spherical nature of the $C_{60}$ molecules.

Some scanning tunnelling microscope images of a carbon sample prepared in accordance with the procedure described hereinabove at pressures of helium at 100 torr show a spherical molecule of twice the diameter of the $C_{60}$ molecules. This is evidence of the existence of a caged molecule containing 240 carbon atoms or a $C_{240}$ molecule.

Samples were prepared for spectroscopy by subliming pure material onto transparent substrates for transmission measurements. Depending on the pressure of helium in the sublimination chamber, the nature of the coatings can range from uniform films (at high vacuum) to coatings of $C_{60}$ smoke (i.e., sub-micron microcrystalline particles of solid $C_{60}$) with the particle size depending to some extent on the pressure.

Figure 3:
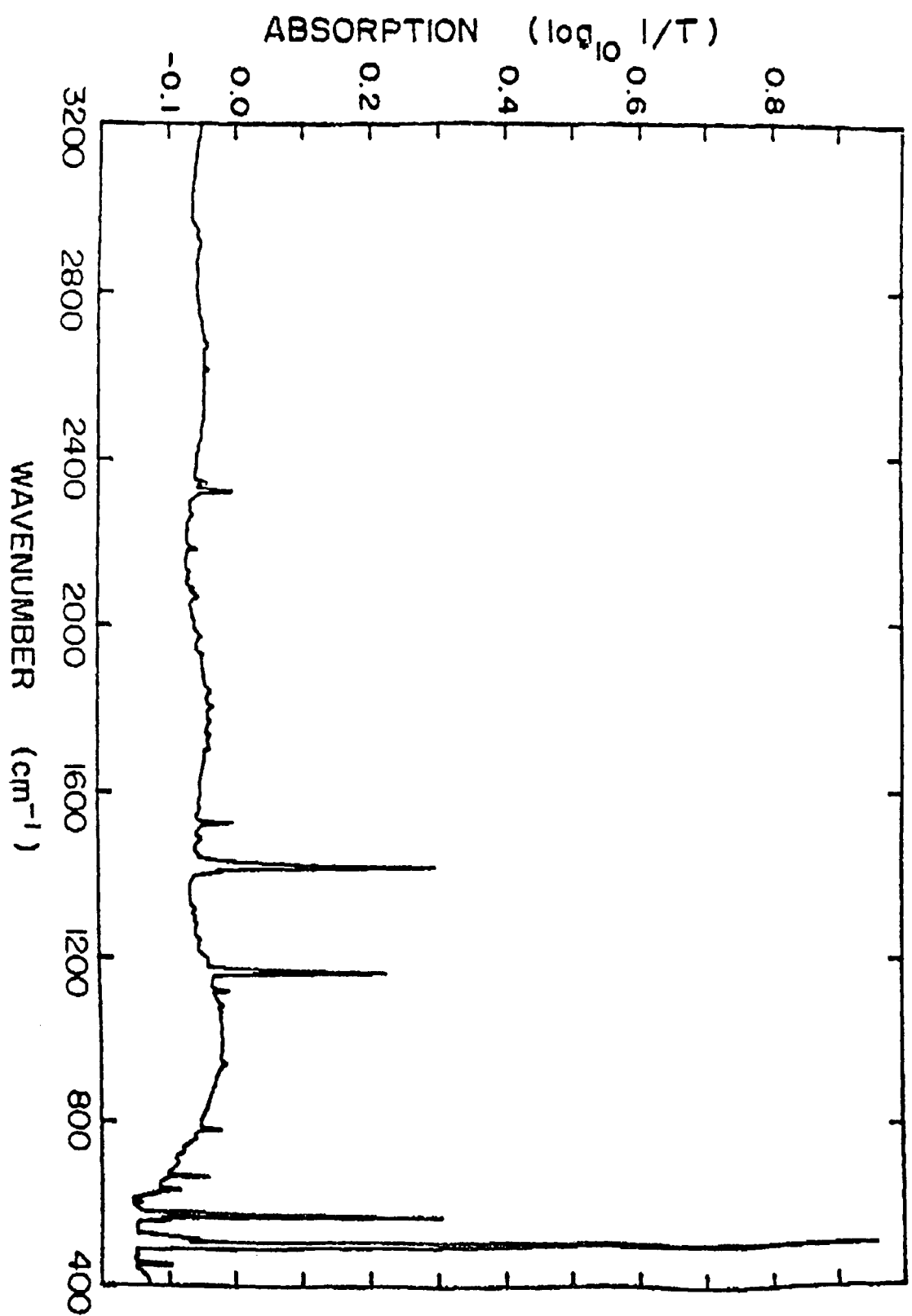
FIG. 3: Infrared absorption spectrum of an approximately 2 micrometer thick coating of the 98% $C_{60}$, 2% $C_{70}$ material on a silicon substrate, referenced to a clean silicon substrate. Absorption is given as optical density=$\log_{10} 1/T$, where T is transmission. Apparent negative absorptions are due to the coating acting in part as a non-reflecting layer.

FIG. 3 shows the transmission spectrum of an approximately 2 micrometer thick $C_{60}$ coating on a silicon substrate. The infrared bands show the four most intense lines at 1429, 1183, 577, and 528 cm$^{-1}$, with no underlying continuum remaining from the soot. In early tries at purifying $C_{60}$ material, the infrared spectrum showed a strong band in the vicinity of 3.0 micrometers, which is characteristic of a CH stretching mode. After much effort, this contaminant was successfully removed by washing the soot with ether and using distilled benzene in the extraction. The spectrum in FIG. 3 was obtained when the material cleaned in such a manner was sublimed under vacuum onto the substrate. The spectrum shows very little indication of CH impurities.

The presence of only four strong bands is what is expected for the free, truncated icosahedral molecule with its unusually high symmetry. Also present are a number of other weak infrared lines which may be due to other causes, among which may be absorption by the $C_{70}$ molecule or symmetry breaking produced, for example, by isotopes other than $C^{12}$ in the $C_{60}$ molecule or by mutual interaction of the $C_{60}$ molecules in the solid. Noteworthy, are weaker features at about 2330 and 2190 cm$^{-1}$ which are located in the near vicinity of the free $CO_2$ and CO stretching modes. This may imply some attachment of $CO_2$ or CO to a small fraction of the total number of $C_{60}$ molecules. Another noteworthy effect can be observed in the feature at 675 cm$^{-1}$, which is weak in the thin film samples but almost as strong as the four main features in the crystals. This vibrational mode may be of solid state rather than molecular origin.

Figure 4:
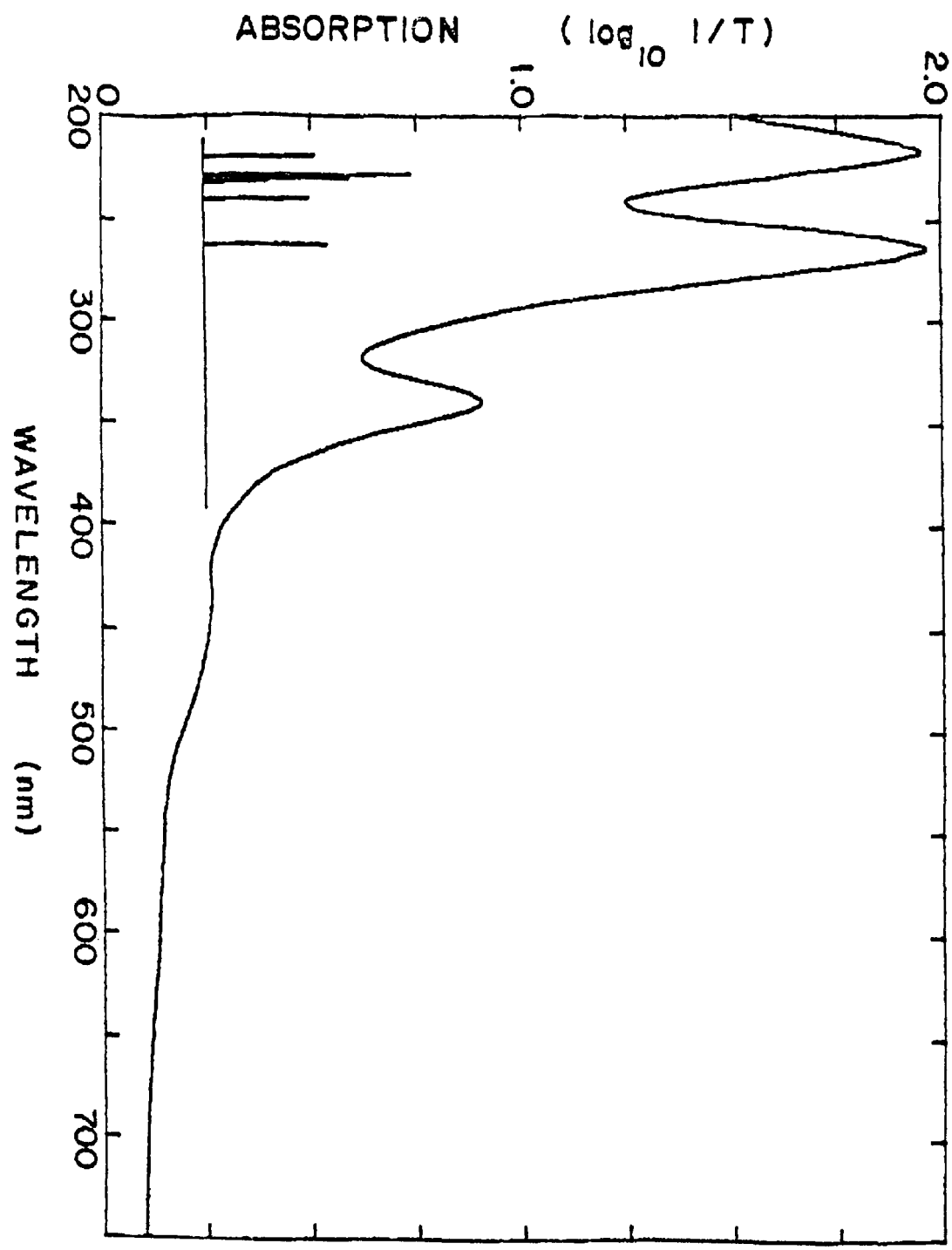
FIG. 4: Visible-ultraviolet absorption spectrum of an approximately 0.1 micrometer thick coating of the 98% $C_{60}$, 2% $C_{70}$ material on quartz. Shown at the bottom are positions and relative oscillator strengths for allowed transitions calculated for the $C_{60}$ molecule by Larsson, et al.

FIG. 4 shows an absorption spectrum taken on a uniform film coated onto a quartz glass substrate. The ultraviolet features are no longer obscured by the graphitic carbon background as in our previous spectra. Broad peaks at 216, 264 and 339 nm dominate the spectra. Weaker structures show up in the visible, including a plateau with ends at about 460 and 500 nm and a very weak peak near 625 nm. At the bottom of FIG. 4 are shown positions and relative oscillator strengths taken from Larsson, et al. (Chem. Phys. Lett. 137, 501-504) calculated for the $C_{60}$ molecule. This reference also shows a variety of forbidden bands with the lowest energy ones in the vicinity of 500 nm. There seems to be a rough correspondence between the present measurements on thin films and the allowed transitions predicted for the molecule. There was no band at 386 nm in our films of $C_{60}$, as disclosed by Heath, et al. (J. Chem. Phys. 87, 4236-4238 (1987)) using a laser depletion spectroscopy method and attributed to the $C_{60}$ molecule. Quite similar spectra to that in FIG. 4 have been recorded for microcrystalline coatings deposited at helium pressures of 100 torr, for example. The peaks occur at the slightly shifted positions of 219, 268, and 345 nm.

The $C_{70}$ molecule is larger than the $C_{60}$ molecule. The $C_{70}$ molecule shows a molecular ion peak at 840 amu. Furthermore, a noticeable peak in the ultraviolet spectrum of the $C_{70}$ molecule taken on a uniform film coated onto a quartz glass substrate is exhibited at about 216 nm. This is a broad peak. Surprisingly, it appears that the $C_{70}$ molecule is more stable than $C_{60}$.

Thus, using the procedures described hereinabove, at quenching pressures of less than 1 atmosphere pressure and especially at pressures of 50-400 torr, a product is produced which is predominantly $C_{60}$ and contains minor amounts of $C_{70}$. The $C_{60}$ product can be used or can be further purified.

Further purification and separation of $C_{60}$ and $C_{70}$ can be made by many conventional techniques known to one skilled in the art, e.g., fractional crystallization, column chromatography, capillary electrophoresis, HPLC, preparative thin-layer chromatography, and the like.

Because the molecular figuration of $C_{60}$ and $C_{70}$ are different, the attractive intermolecular forces are different which allows for the two molecules to be readily separated.

Furthermore, the solubility of $C_{60}$ and $C_{70}$ in pure solvents and mixed solvents are also different from each other, which also makes the two compounds separable by using conventional techniques known to one skilled in the art, such as crystallization, extraction, and the like.

For example, pure $C_{60}$ and pure $C_{70}$ molecules can be isolated as follows. The black sooty mixture of $C_{60}$ and $C_{70}$ which is produced according to the procedure described hereinabove is placed in the extracting solvent, such as benzene. The insoluble residue is removed and the resulting benzene solution containing $C_{60}$ and $C_{70}$ molecules is concentrated. The $C_{60}$ and $C_{70}$ solution is added to a packed column with an adsorbent, such as alumina. The column is eluted with an eluent such as benzene or a mixture of benzene and toluene. Various fractions of set volume e.g., 10 mL, are collected. The eluent i.e., the solvent is removed from each fraction such as by evaporation to dryness. The fractions with product will contain microcrystals, the identity of which can be confirmed by spectroscopy, e.g., mass spectroscopy.

Thus, the process of the present invention can produce a product which is predominantly $C_{60}$, which, if desired, can be further purified by the purification and separation techniques described hereinabove.

Furthermore, the present invention contemplates two different variations of the procedure described hereinabove to make $C_{70}$ molecules. First, if subatmospheric pressures of quenching gases are used in the initial step, small amounts of $C_{70}$ are produced, which can be separated from the $C_{60}$ molecules using the purification techniques described hereinabove. However, if the pressure of the quenching gas is raised to at least 2 atmospheres, after separation and purification, a greater percentage of substantially pure $C_{70}$ would be produced from each vaporization of carbon.

The present new products, $C_{60}$, $C_{70}$, or mixtures thereof have the similar utilities as graphite. However, they are particularly valuable for forming products of a higher order of stability than those formed from graphitic carbon, and can be processed into formed or molded products such as $C_{60}$ fibers, $C_{70}$ fibers, or mixtures thereof using standard processing techniques. In this regard, free-flowing, particulate $C_{60}$ and $C_{70}$ are of special value particularly for use in producing molded products, especially those extended in at least one direction. $C_{60}$, and $C_{70}$ are also useful for producing a low temperature $C_{60}$ vapor (300°-400° C.) and $C_{70}$ vapor of the respective molecules to produce low temperature atomic and molecular beams of carbon which is not now possible using graphite as the carbon source. Further, the synthesis of compounds such as $C_{60}H_{60}$ and $C_{60}F_{60}$ can be accomplished by introducing hydrogen and fluorine, respectively, into a reactor containing $C_{60}$ vapor. Furthermore, the $C_{60}$ product and the $C_{70}$ product may be used as an industrial paint pigment or as a lubricant. Moreover, since the $C_{60}$ and $C_{70}$ molecule are hollow, they could be used for binding and/or storing molecules e.g., toxic material.

Example 1

$C_{60}$-containing carbon dust was produced in a conventional bell-jar carbon evaporator which was first evacuated to $10^{-4}$ torr by either an oil diffusion pump or a turbo pump, both equipped with liquid nitrogen traps, and then filled with an inert quenching gas. Helium and argon were used at pressures ranging up to 400 torr. Then graphite rods (as previously described herein) were evaporated using a current of about 100 amps (either AC or DC).

The smoke which formed in the vicinity of the evaporating carbon rods was collected on substrates which were placed within 5 cm to 10 cm of the evaporating carbon rods.

The evaporator was opened after a cool down period of 10-30 min. and the carbon dust samples removed by scraping substrate surfaces and the internal surfaces of the bell-jar. After washing with ether, the collected dust samples were then extracted with benzene to produce a wine-red to brown solution. On evaporation of the solution, $C_{60}$ was obtained as a microcrystalline residue.

The crystals were sublimed by heating in vacuo or in a quenching inert gas to 400° C. and collected on a substrate. The sublimed product was brown to gray in color.

In powder form, the present new carbon allotrope is brownish-red.

Example 2

The procedure of Example 1 is repeated except, in the original step, the graphite rods are evaporated at 2 or more atmospheres of helium pressure in the chamber. The product obtained from this procedure contains a greater percentage of $C_{70}$ than does the product in Example 1.

Example 3

Pure $C_{60}$ and pure $C_{70}$ are obtained as follows:

The $C_{60}$ and $C_{70}$ mixtures prepared in either Examples 1 or 2 are dissolved in benzene and added to an alumina column. Using benzene as the eluent, the fractions are collected and each elute fraction is evaporated to dryness. The presence of $C_{60}$ or $C_{70}$ in the fraction can be determined by taking mass spectroscopy thereof.

The above embodiments and examples are given to illustrate the scope and spirit of the instant invention. These embodiments and examples are within the contemplation of the present invention. Therefore, the present invention should be limited only by the appended claims.

What is claimed is:

1. Purified cage molecules consisting of carbon atoms.
2. Purified cage molecules consisting of carbon atoms in solid form.
3. Crystalline cage molecules consisting of carbon atoms.
4. A macroscopic amount of purified cage molecules consisting of carbon atoms.
5. A formed or molded product comprising purified $C_{60}$ and/or $C_{70}$.
6. A free-flowing particulate comprising cage molecules consisting of carbon atoms in microcrystalline form.
7. A solid comprising a macroscopic amount of cage molecules consisting of carbon atoms in crystalline form.
8. Purified cage molecules consisting of carbon atoms prepared by the process comprising: (a) vaporizing a carbon source in the presence of an inert quenching gas under conditions effective to provide a sooty carbon product comprising cage molecules consisting of carbon atoms; (b) depositing the sooty carbon product on a collecting substrate; (c) removing the sooty carbon product from the collecting substrate; (d) contacting the sooty carbon product with a non-polar organic solvent effective to dissolve said cage molecules to form a solvent solution, said solvent being present in an amount effective to dissolve said cage molecules in said sooty carbon product; and (e) recovering from said said solvent solution purified cage molecules consisting of carbon atoms in a macroscopic amount.

9. The purified cage molecules consisting of carbon atoms of claim 8 in which the carbon in step (a) is vaporized in an evacuated reactor.

10. The purified cage molecules consisting of carbon atoms of claim 9 in which the carbon source of step (a) is vaporized in an evacuated bell jar.

11. The purified cage molecules consisting of carbon atoms of claim 8 in which the carbon source subject to vaporization in step (a) is graphite.

12. The purified cage molecules consisting of carbon atoms of claim 8 in which the carbon source subject to vaporization in step (a) is graphite rods.

13. The purified cage molecules consisting of carbon atoms of claim 8 wherein the carbon source is vaporized in step (a) through heating the carbon source by means of an electrical current of sufficient intensity to produce the sooty carbon product.

14. The purified cage molecules consisting of carbon atoms of claim 13 wherein the electrical current is about 100 amps.

15. The purified cage molecules consisting of carbon atoms of claim 8 wherein the inert quenching gas of step (a) is a noble gas.

16. The purified cage molecules consisting of carbon atoms claim 8 wherein the carbon source is vaporized in step (a) at a pressure ranging from 50 torr to 400 torr.

17. The purified cage molecules consisting of carbon atoms of claim 16 wherein the carbon is vaporized in step (a) at approximately 100 torr.

18. The purified cage molecules consisting of carbon atoms of claim 8 wherein the carbon is vaporized in step (a) at a pressure ranging from about 2 to 3 atmospheres.

19. The purified cage molecules consisting of carbon atoms claim 8 wherein the collecting substrate in step (b) is a glass surface.

20. The purified cage molecules consisting of carbon atoms of claim 15 wherein the inert gas is helium or argon.

21. The purified cage molecules consisting of carbon atoms of claim 8 wherein the non-polar organic solvent of step (d) is carbon disulfide, benzene, carbon tetrachloride or toluene.

22. The purified cage molecules consisting of carbon atoms of claim 21 wherein the solvent is benzene.

23. The purified cage molecules consisting of carbon atoms of claim 21 wherein the solvent is carbon tetrachloride.

24. The purified cage molecules consisting of carbon atoms of claim 8 wherein recovery step (e) comprises evaporating the solvent.

25. Purified cage molecules consisting of carbon atoms prepared by the process comprising: (a) evaporating a carbon source in the presence of an inert quenching gas under conditions effective to produce a sooty carbon product containing cage molecules consisting of carbon atoms, said cage molecules being present in said sooty carbon product in sufficient concentration to allow a macroscopic amount of said cage molecules to be separated from said sooty product; (b) collecting the sooty carbon product produced therefrom; (c) subliming said cage molecules from the sooty carbon product; and (d) condensing said cage molecules.

26. The purified cage molecules consisting of carbon atoms of claim 25, wherein said collecting in step (b) is done on a glass surface.

27. The purified cage molecules consisting of carbon atoms of claim 25 wherein step (c) comprises heating said sooty carbon product comprising said cage molecules in a vacuum or inert atmosphere at effective sublimation temperatures to extract said cage molecules from said sooty carbon product.

28. The purified cage molecules consisting of carbon atoms of claim 25 in which the carbon source in step (a) is vaporized in an evacuated reactor.

29. The purified cage molecules consisting of carbon atoms of claim 28 in which the carbon in step (a) is vaporized in an evacuated bell jar.

30. The purified cage molecules consisting of carbon atoms of claim 25 in which the carbon subject to vaporization in step (a) is graphite.

31. The purified cage molecules consisting of carbon atoms of claim 25 in which the carbon subject to vaporization in step (a) is graphite rods.

32. The purified cage molecules consisting of carbon atoms of claim 25, wherein the carbon source in step (a) is vaporized by passing an electric current of sufficient intensity to produce a sooty carbon product.

33. The purified cage molecules consisting of carbon atoms of claim 32, wherein the electrical current is about 100 amps.

34. The purified cage molecules consisting of carbon atoms of claim 25, wherein the inert quenching gas of step (a) is a noble gas.

35. The purified cage molecules consisting of carbon atoms of claim 25, wherein the carbon source in step (a) is vaporized at a pressure ranging from 50 torr to 400 torr.

36. The purified cage molecules consisting of carbon atoms of claim 35, wherein the carbon source is vaporized in step (a) at approximately 100 torr.

37. The purified cage molecules consisting of carbon atoms of claim 34, wherein the noble gas is helium or argon.

38. An industrial paint pigment comprising $C_{60}$ and/or $C_{70}$.

39. A lubricant comprising $C_{60}$ and/or $C_{70}$.

* * * * *